Jan. 19, 1971 — J. ULDERUP — 3,555,851
UNIVERSAL JOINT
Filed Jan. 13, 1969 — 4 Sheets-Sheet 1
FIG.1
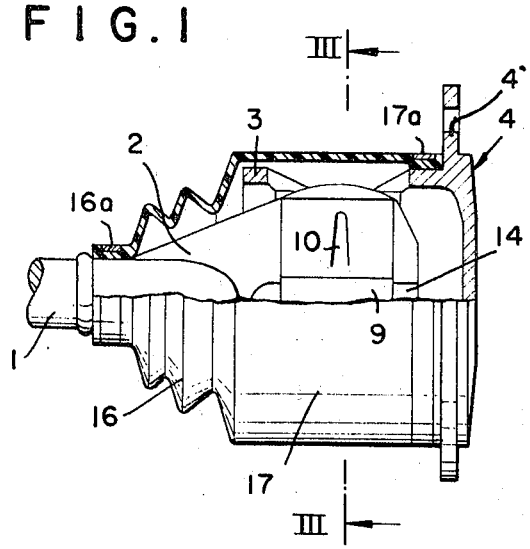
FIG.1-A
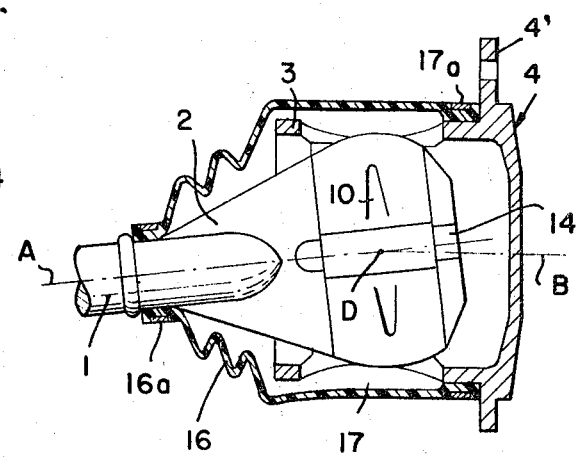
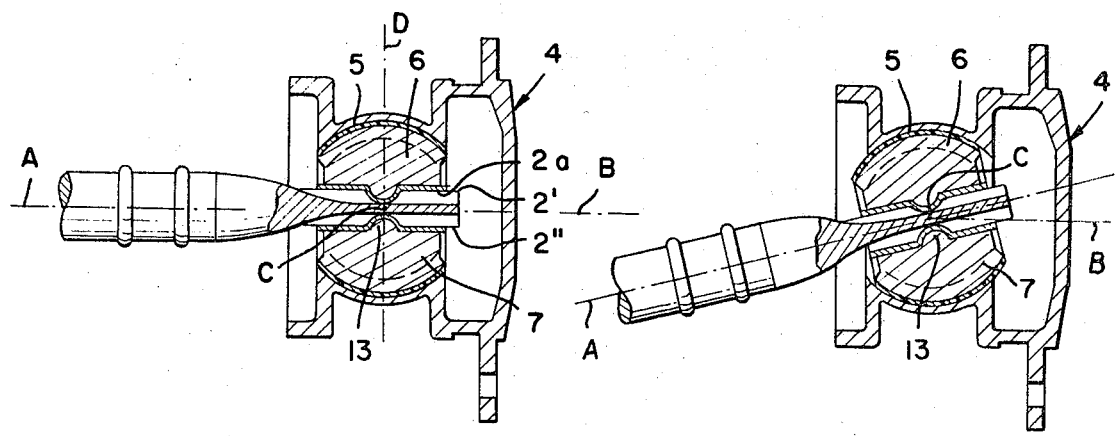
FIG.2        FIG.2-A
INVENTOR.
JÜRGEN ULDERUP
BY Karl J. R...
ATTORNEY Jan. 19, 1971   J. ULDERUP   3,555,851
UNIVERSAL JOINT
Filed Jan. 13, 1969   4 Sheets-Sheet 2
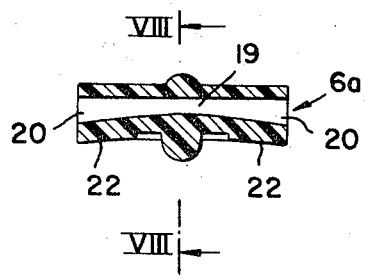
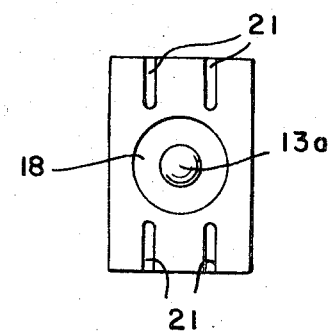
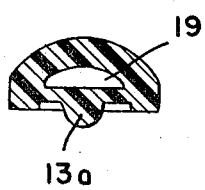
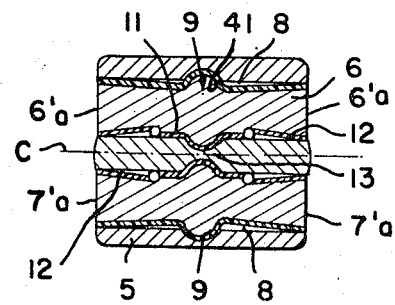
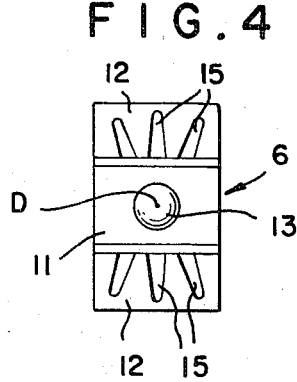
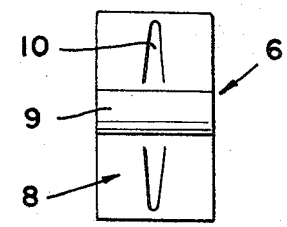
INVENTOR.
JÜRGEN ULDERUP
BY
Karl F. Ross
ATTORNEY Jan. 19, 1971  J. ULDERUP  3,555,851
UNIVERSAL JOINT
Filed Jan. 13, 1969  4 Sheets-Sheet 3
FIG. 9
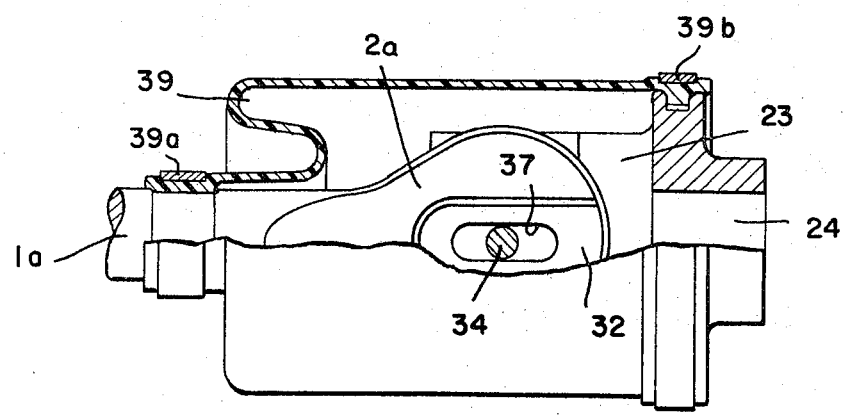
FIG. 9-A
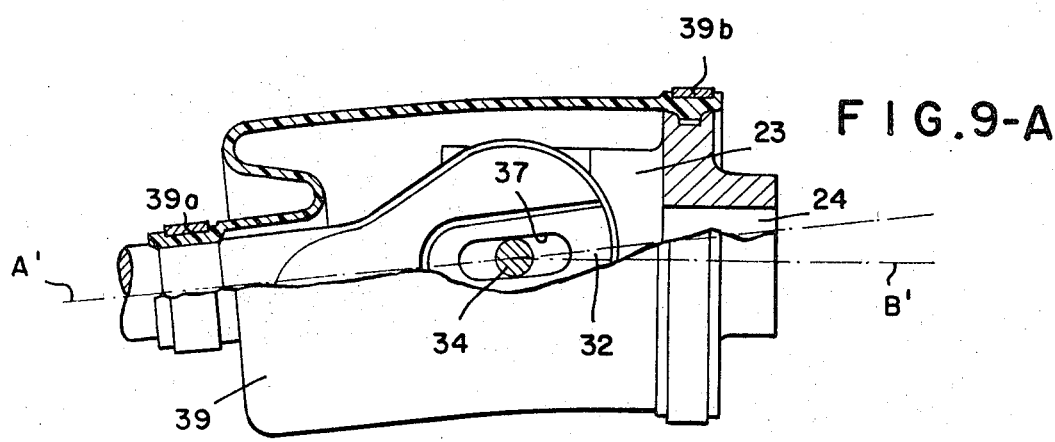
FIG. 11
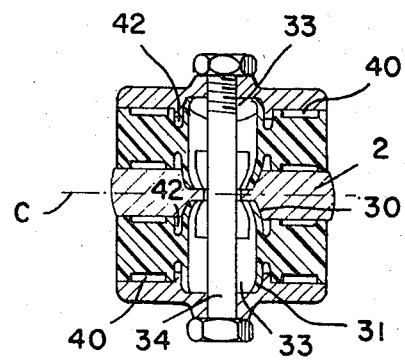
INVENTOR.
JÜRGEN ULDERUP
BY Karl F. Ross
ATTORNEY

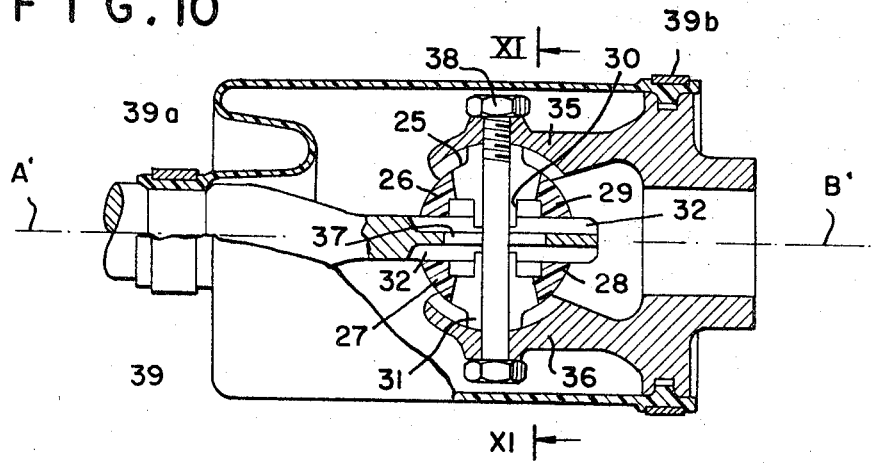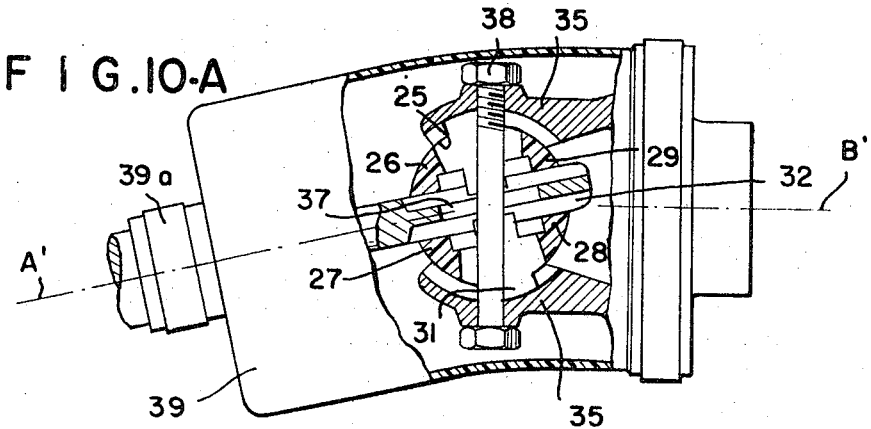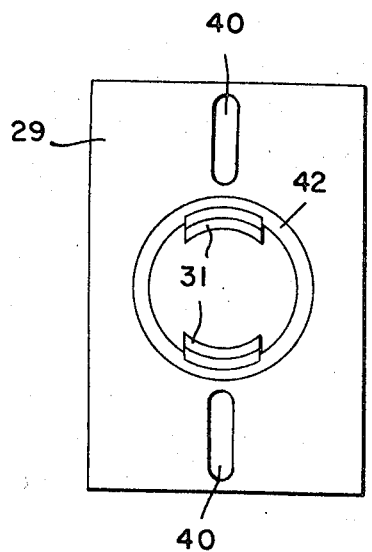

United States Patent Office 3,555,851
Patented Jan. 19, 1971

---

3,555,851
UNIVERSAL JOINT
Jürgen Ulderup, Lemforde, Germany, assignor to Firma Lemforder Metallwaren AG., Lemforde, Germany, a corporation of Germany
Filed Jan. 13, 1969, Ser. No. 790,575
Claims priority, application Germany, Jan. 13, 1968, 1,675,154
Int. Cl. F16d 3/28
U.S. Cl. 64—11        16 Claims

ABSTRACT OF THE DISCLOSURE

A universal or cardan coupling or joint comprises a first body formed with a spoon-shaped flattened end portion in the form of a tongue and a second body formed with a cylindrical seat lying transverse to the rotation axis of the second body. A bearing comprising two elongated bearing members of semicircular cross section or a single member of circular section is received in this seat and defines a flattened-section channel, retaining the flattened end portion between its flat surfaces. The outside of the bearing is formed with a ridge fitting a circumferential groove in the seat while the flattened end is formed with grooves on its opposite faces which receive respective bumps on the flat faces of the bearing members. These ridges and bumps constitute mating formations which serve to center the first body in the bearing and to center the bearing in the seat of the second body.

---

My present invention relates to a universal or cardan coupling or joint, especially for use in a vehicular power train.

Universal joints are standard and necessary articles for a multitude of mechanical installations in which two imprecisely aligned shafts may be rotatably interconnected. Angular offsettings of a substantial degree can be compensated for by such devices. None the less, certain problems are often present.

One of these problems is that, with increased use, play develops in such joints of conventional design and, with increasing play, the deterioration due to wear and higher stress may increase the play still further. In a system such as a vehicular power train this leads to many disadvantageous side effects. Adjustments to eliminate this play is often extremely difficult.

A further disadvantage is that these joints may take up a sizable amount of space which can often be ill afforeded. What is more, they require a good deal of periodic servicing: e.g. lubrication and tightening.

It is therefore the principal object of my invention to provide an improved universal joint which can overcome these and other disadvantages.

A more specific object of my invention is to provide an improved universal joint of reduced dimensions.

These objects are attained, in accordance with the principal features of my invention, by a universal joint which comprises a first rotatable body, a second rotatable body, and bearing means connecting the two. More specifically, the first body or shaft is formed with a spoon shaped flattened end or tongue and the second body or shaft is formed with a cylindrical seat whose axis lies transverse to the avis of rotation of the second body. The bearing means comprises two bearing members of semicircular cross section or a single member of circular cross section whose curved outer surfaces fit the seat and which define, in a central groove of flattened section, flat inner surfaces holding the flattened end of the first body. This allows a wide angle of pivotal movement between the first and second body about an axis perpendicular to this tongue and the axis of rotation of the shaft provided therewith.

An important feature of my invention includes a centering formation on the flattened end which mates with a similiar formation on the flat faces of the bearing halves. A mating groove and ridge are provided on the curved surfaces of the bearing and the seat to further keep the assembly centered while nevertheless permitting relative angular movement with two degrees of freedom. In this manner the joint operates with a minimum of power loss and friction.

These bearing members can be made of a strong resiliently compressible synthetic resin such as polyurethane or some other elastromeric material, e.g. natural or synthetic rubber. In this case they are jacketed for protection against excessive wear.

They can also be made, according to the invention, with an aluminum core with a wear-resistant steel jacket against the flattened member and a wear-reducing low friction (e.g. polytetrafluoroethylene or polyformaldehyde) layer or coating against the seat.

A further feature of the invention provides for grooves the bearing halves which serve in part to prestress or precompress, preferably to a varying degree, the bearing member along its length, thereby allowing the expansion of the bearing member to take up any increase in play, say to the extent of at least 1 mm. This prestressing is different along the length, being ideally greater toward the edges of the flattended end and less at the center coincidental with the centering formations whereby the formations are more yieldable and can have a greater stroke within the elastic limits of the material. In the case of a synthetic-resin bearing member, a hole with flaring ends is advantageously bored longitudinally through the member and the centering hump on the half is surrounded by an annular weakened portion, while the "prestress" or precompression derives from a tightenable bolt spanning the resiliently deflectable cantilevered opposing jaws of the second body between which the bearing is held.

These and other objects, features, and advantages of my invention will be described in greater detail below with reference to the accompanying drawing, in which:

FIG. 1 is a top view, partly in section, of a universal joint according to my invention;

FIG. 1A is a view similar to FIG. 1 showing the tongued shaft angularly offset from an aligned position of the shaft;

FIG. 2 is a side view, partly in section, of the universal joint shown in FIG. 1;

FIG. 2A is a view similar to FIG. 2 showing the angular offsetting of the shafts about an axis perpendicular to the offset axis of FIG. 1A;

FIG. 3 is a section along line III—III of FIG. 1;

FIG. 4 is a top view of a bearing member of FIG. 1;

FIG. 5 is a bottom view of a bearing member of FIG. 1;

FIG. 6 is a longitudinal section through an alternative form of a bearing member according to my invention;

FIG. 7 is a bottom view of the bearing member as shown in FIG. 6;

FIG. 8 is a section along line VIII—VIII of FIG. 6;

FIG. 9 is a top view, partly in section, of another universal joint according to my invention;

FIG. 9A is a view similar to FIG. 9 showing the tongued shaft angularly offset from an aligned position of the shafts;

FIG. 10 is a side view, partly in section, of the universal joint as shown in FIG. 9;

FIG. 10A is a view similar to FIG. 10 showing the relative angular offsetting of the shafts about an axis perpendicular to the offset axis of FIG. 1A;

FIG. 11 is a section along line XI—XI of FIG. 10; and

FIG. 12 is a bottom view of the bearing member of the universal joint shown in FIG. 9.

FIGS. 1–5 show a universal joint according to my invention wherein a first body or shaft 1 is rotatable about an axis A (FIG. 2) and a second body 3, 4, which can be connected to the other shaft, is rotatable about an axis B. These axes A and B are shown in line in FIGS. 1 and 2 although they can be out of line or offset as illustrated in FIGS. 1A and 2A.

The body or shaft 1 has a spoon-shaped flattened end portion or tongue 2 with two flat faces 2', 2" each engaged by respective flat surfaces of bearing members 6 and 7, together forming the bearing. The body 4, which can be attached by bolts through its flange 4' to a further shaft, is formed with a cylindrical sleeve defining a seat 5 having a cylinder axis C (FIGS. 2 and 3) parallel to the tongue 2 but perpendicular to the axes A and B at their interaction point (FIG. 2A).

The flat, inwardly directed surfaces of the members 6 and 7 are each formed with a centering bump 13 which is received in a groove 14 in the flattened end portion of the shaft 1 which, as shown in FIG. 1A, is linearly elongated parallel to the shaft axis. The curved surfaces of the members 6 and 7 are formed with ridges 9 received in narrow-linear grooves 14 in the seat 5. These formations serve to center the end portion 2 in the slot or space between the bearing members 6 and 7. In this manner the axis A of the shaft 1 can pivot in any direction around the axis D established by the bumps 13 which always lies at the point where the axes A and B intersect and which extends perpendicularly thereto and to the tongue 2. Thus, the universal joint here illustrated can rotate two degrees of freedom, but with a minimum of loss and oscillation.

The bearing members 6 and 7 each have steel plates or linings along the flat surfaces defining the channel or groove 2a consisting of a central piece 11 formed with the bump 13 and lateral pieces 12 formed with lubrication channels 15 radiating from the axis D of rotational symmetry of the bump. The outer or curved surface is formed by a coating 8 of a low-friction wear-resistant synthetic resin, e.g. polytetrafluoroethylene (Teflon), in which circumferential lubricating channels 10 are formed. The core of the bearing members 6 or 7 is made of an elastically compressible material, e.g. aluminum, polyurethane, natural rubber, or synthetic rubber.

FIG. 3 shows how the individual bearing members 6 and 7 are stressed against the end portion 2 and the seat 5. These bearing members 6 and 7 are wider at their end regions 6a', 7a' than at their center regions and are held in the sleeve 3 under elastic compression to extend with wear and best transmit force with the development of a minimum of play. The compression should be such as to enable the expansion to take up at least 1 mm. of wear.

FIGS. 6–8 show an alternative bearing member 6a which is made of limitedly elastically compressible polytetrafluoroethylene such as Teflon or a low-friction material made by polymerization of waterfree formaldehyde ($CH_2O$). This member 6a is formed with a longitudinal bore 19 with flared ends 20. Its centering bump 13a is surrounded by an annular indented portion 18 and its flat surface is formed with longitudinal grooves 21 which serve to increase the elasticity and form a membrane. The latter is more readily deformed at the central portion and bears with less force on the tongue, while the outer portions are under higher compressive force. Due to the various formations of this member 6a it is prestressed similarly to the members 6 and 7 of FIGS. 1–5 with edge regions 22 pressing against the respective end regions of the portion 2.

In both cases, with members 6 and 7 or members 6a, the body 4 is connected to a boot 17 with a bellows cuff 16 by respective rings 16a and 17a to retain a lubricant (i.e. grease) inside the bearing and to prevent dirt from entering. This boot 16–17 is preferably made of some very rugged material such as polytetrafluoroethylene.

FIGS. 9–12 show an alternative embodiment of a universal joint whose play is adjustable. Here a first body 1a rotatable about an axis A' has a flattened end portion 2a formed with a longitudinal groove 32 and a throughgoing passage or slot 37. A body 23 rotatable about an axis B' has a seat 25 formed by two flank members or jaws 35 and 36 through which a bolt 34 with a nut 38 passes. Two bearing members 26 and 27 of the same polyformaldehyde composition as the member 6a above are formed with passages 33 for the bolt 34.

Next to each passage 33 is a raised portion 31 acting as centering ridge in the seat 25 and another raised portion 30 acting as centering bump in the groove 32. Both surfaces of the members 26 and 27 are formed with longitudinal lubricating channels 40. Surrounding each raised portion 31 and 33 is a channel 42.

A Teflon boot 39 held in place by rings 39a and 39b holds the lubricant in the joint and keeps the dirt out. A shaft can be connected to the member in the hole 24.

Resetting of the play or original setting of the desired play is accomplished by tightening or loosening the bolt 34 with the nut 38.

I claim:
1. A universal joint comprising:
a first body rotatable about a first axis and formed with a flattened end portion lying in a plane including said first axis and having two opposite faces;
a second body rotatable about a second axis and formed with a cylindrical seat having a cylinder axis transverse to said second axis; and
cylindrical bearing means received in said seat and formed with a central channel parallel to said cylinder axis, said channel receiving said end portion with said opposite faces thereof engaging sides of said channel, said faces and said sides being provided with mating centering formations, said bearing means being limitedly rotatable in said seat about said cylinder axis and said end portion being limitedly rotatable in said channel about a third axis transverse to said cylinder axis and to said first axis, said mating centering formations including a narrow linear groove formed in at least one of said faces substantially parallel to said first axis and, on the respective side of said channel, a bump received in said groove, said bump being in line with said second axis while being rotationally symmetrical about a third axis perpendicular to said faces, said cylindrical seat and said bearing means being formed with interengaging centering means comprising a ridge and a groove lying in a plane defined by the first and third axes.

2. The universal joint defined in claim 1 wherein said bearing means is formed with said ridge and said seat is formed with said groove.

3. A universal joint comprising:
a first body rotatable about a first axis and formed with a flattened end portion lying in a plane including said first axis and having two opposite faces;
a second body rotatable about a second axis and formed with a cylindrical seat having a cylinder axis transverse to said second axis; and
cylindrical bearing means received in said seat and formed with a central channel parallel to said cylinder axis, said channel receiving said end portion with said opposite faces thereof engaging sides of said channel, said faces and said sides being provided with mating centering formations, said bearing means being limitedly rotatable in said seat about said cylinder axis and said end portion being limitedly rotatable in said channel about a third axis transverse to said cylinder and to said first axis, said seat comprising opposing mutually displaceable resilient jaws, said joint further comprising adjusting means for drawing said jaws toward each other for adjustably compressing said bearing means in said seat.

4. The universal joint defined in claim 3 wherein said adjusting means comprises screw means, said bearing means, said jaws and said end portion being formed with respective in-line passages, said screw means extending through said passages and externally engaging said jaws whereby on tightening of said screw means said jaws are displaced toward one another.

5. The universal joint defined in claim 4 wherein said end portion is formed with a throughgoing slot substantially parallel to said first axis, said slot constituting the respective passage of said end portion.

6. The universal joint defined in claim 4 wherein said bearing means is formed with a throughgoing slot substantially parallel to said first axis, said bearing means further being formed with a raised portion surrounding said slot and said end portion being formed with a groove receiving said raised portion.

7. A universal joint comprising:
a first body rotatable about a first axis and formed with a flattened end portion lying in a plane including said first axis and having two opposite faces;
a second body rotatable about a second axis and formed with a cylindrical seat having a cylinder axis transverse to said second axis, and
cylindrical bearing means received in said seat and formed with a central channel parallel to said cylinder axis, said channel receiving said end portion with said opposite faces thereof engaging sides of said channel, said faces and said sides being provided with mating centering formations, said bearing means being limitedly rotatable in said seat about said cylinder axis and said end portion being limitedly rotatable in said channel about a third axis transverse to said cylinder axis and to said first axis, said bearing means comprising two identical elongated bearing members each being substantially of semicircular cross section with one elongated curved surface adapted to fit said seat and one elongated flat surface forming said side for engagement with said face of said end portion, each of said bearing means being stressed against said seat and against said end portion.

8. The universal joint defined in claim 7 wherein each of said bearing members has an aluminum core, a steel covering on said flat surface and a coating of a low-friction synthetic resin on said curved surface.

9. The universal joint defined in claim 8 wherein said steel covering comprises a separate central portion and two separate end portions.

10. The universal joint defined in claim 7 wherein each of said bearing means is stressed more heavily against edge regions of said end portion and end regions of said seat than against central regions of said end portion and of said seat.

11. The universal joint defined in claim 7 wherein each of said bearing members is elastic and is formed with a longitudinal bore; said mating centering formation including a central bump on said flat surface, and a groove formed in said end portion substantially parallel to said first axis and receiving said bump, said flat surface being further formed with an annular indented portion surrounding said bump.

12. The universal joint defined in claim 11 wherein said longitudinal bore is formed with outwardly flared ends.

13. A universal joint comprising:
a first body rotatable about a first axis and formed with a flattened end portion lying in a plane including said first axis and having two opposite faces;
a second body rotatable about a second axis and formed with a cylindrical seat having a cylinder axis transverse to said second axis; and
cylindrical bearing means received in said seat and formed with a central channel parallel to said cylinder axis, said channel receiving said end portion with said opposite faces thereof engaging sides of said channel, said faces and said sides being provided with mating centering formations, said bearing means being limitedly rotatable in said seat about said cylinder axis and said end portion being limitedly rotatable in said channel about a third axis transverse to said cylinder axis and to said first axis, said bearing means comprising two identical elongated bearing members each being substantially of semicircular cross section with one elongated curved surface adapted to fit said seat and one elongated flat surface forming said side for engagement with said face of said end portion, said mating centering formation including a central bump formed on said flat surface and a groove formed on said end portion substantially parallel to said first axis and receiving said bump, said flat surface further being formed with lubricating channels substantially radial of said bump.

14. The universal joint defined in claim 13 wherein said curved surface is formed with at least one substantially elongated lubricating channel.

15. A universal joint comprising:
a first body rotatable about a first axis and formed with a flattened end portion lying in a plane including said first axis and having two opposite faces;
a second body rotatable about a second axis and formed with a cylindrical seat having a cylinder axis transverse to said second axis, and
cylindrical bearing means received in said seat and formed with a central channel parallel to said cylinder axis, said channel receiving said end portion with said opposite faces thereof engaging sides of said channel, said faces and said sides being provided with mating centering formations, said bearing means being limitedly rotatable in said seat about said cylinder axis and said end portion being limitedly rotatable in said channel about a third axis transverse to to said cylinder axis and to said first axis, said bearing means comprising two elongated bearing members of substantially semi-circular cross section having a flat elongated surface and a curved elongated surface, said flat surface having a steel laminating and said curved surface being coated with a low-friction synthetic resin, the core of each of said members being aluminum, said mating centering formations comprising a bump centrally formed on said sides of said channel and a groove on said faces of said end portion receiving said bump, said curved surfaces being formed with a ridge extending transverse to said cylinder axis, and said seat being formed with a groove receiving said ridge, said steel layer and said coating being formed with lubricating channels, and said joint further comprising a flexible boot connecting said two bodies together and enclosing said end portion and said seat.

16. A universal joint comprising:
a first body rotatable about a first axis and formed with a flattened end portion lying in a plane including said first axis and having two opposite faces;
a second body rotatable about a second axis and formed with a cylindrical seat having a cylinder axis transverse to said second axis; and
cylindrical bearing means received in said seat and formed with a central channel parallel to said cylinder axis, said channel receiving said end portion with said opposite faces thereof engaging sides of said channel, said faces and said sides being provided with mating centering formations, said bearing means being limitedly rotatable in said seat about said cylinder axis and said end portion being limitedly rotatable in said channel about a third axis transverse to said cylinder axis and to said first axis, said bearing means comprising two elongated bearing members of semicircular cross section each having a curved and a flat surface, said flat surface constituting one of the sides of said channel, said members being formed of a synthetic resin, said second body further having two jaws slightly displaceable toward each other and forming said seat, said joint further comprising a bolt, said bearing members, end portion, and jaws being formed with respective in-line passages, said bolt being received in said passages and adapted on tightening to displace said jaws toward one another, said end portion being formed with longitudinal grooves on its faces and said seat being formed with a circumferential groove formed with raised portions flanking said respective passage and acting as said centering formations with said grooves of said portions and of said seat, said joint further comprising a boot connected between said first and second bodies and adapted to prevent entry of dust into said seat.

References Cited

UNITED STATES PATENTS 1,556,840 10/1925 Kadesch _____ 64—17
3,070,978 1/1963 Langkop _____ 64—7

JAMES A. WONG, Primary Examiner

U.S. Cl. X.R.

64—17